June 6, 1950   C. R. ZIMMER   2,510,359
ROW FEEDING APPARATUS
Filed April 12, 1945   5 Sheets-Sheet 5
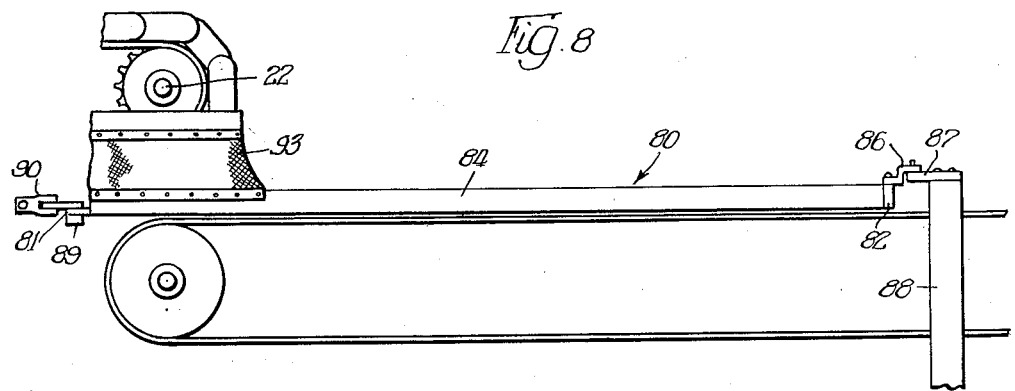
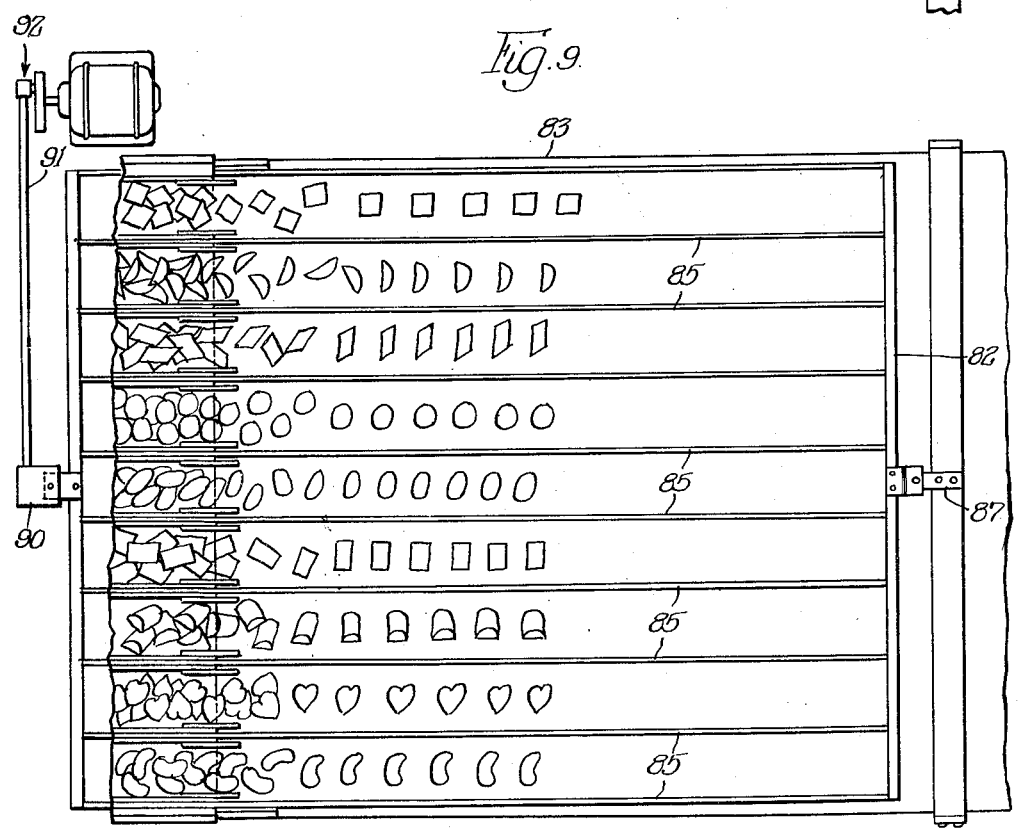
INVENTOR.
Clyde R. Zimmer,
BY
Cromwell, Greist & Warden Patented June 6, 1950

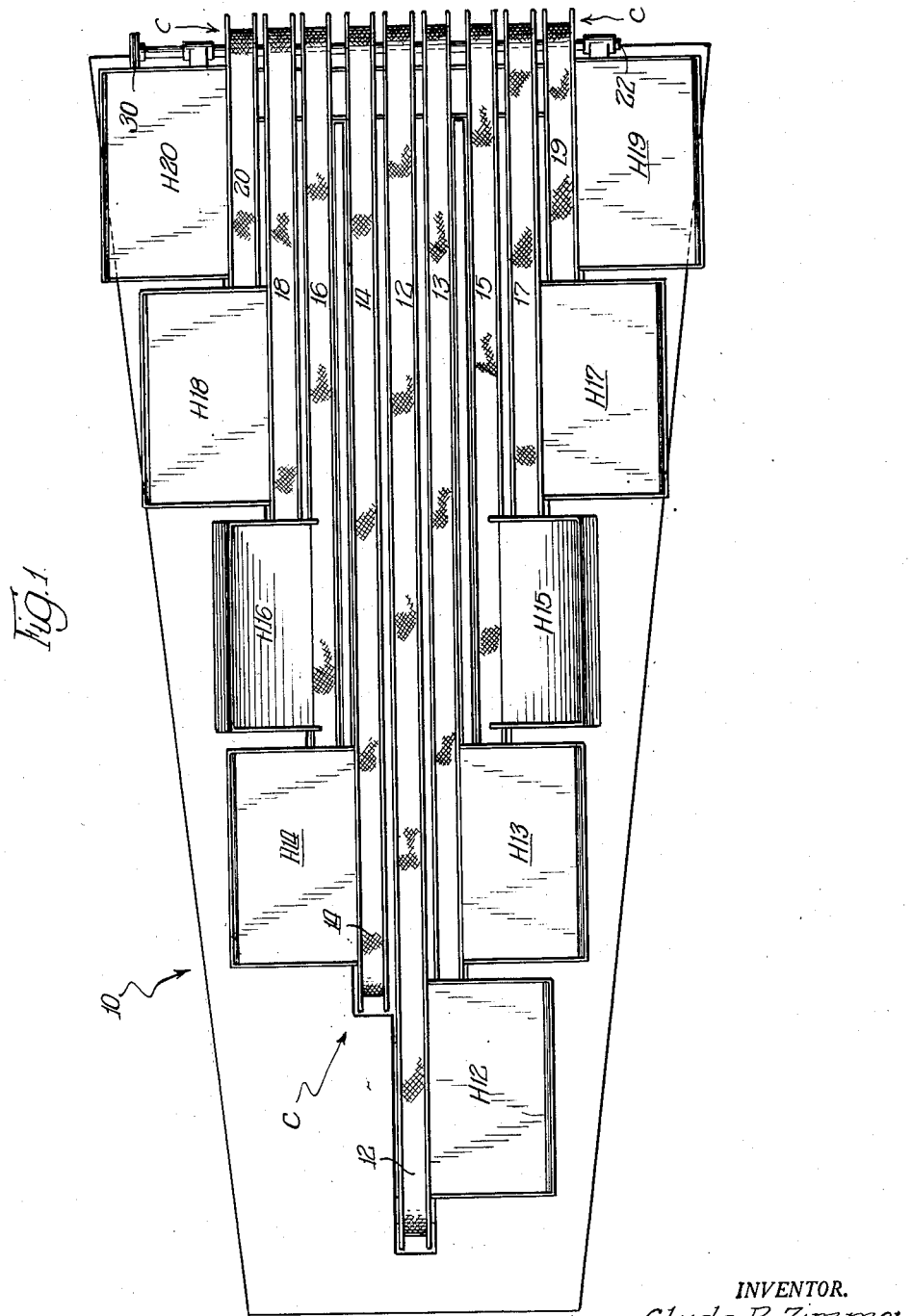

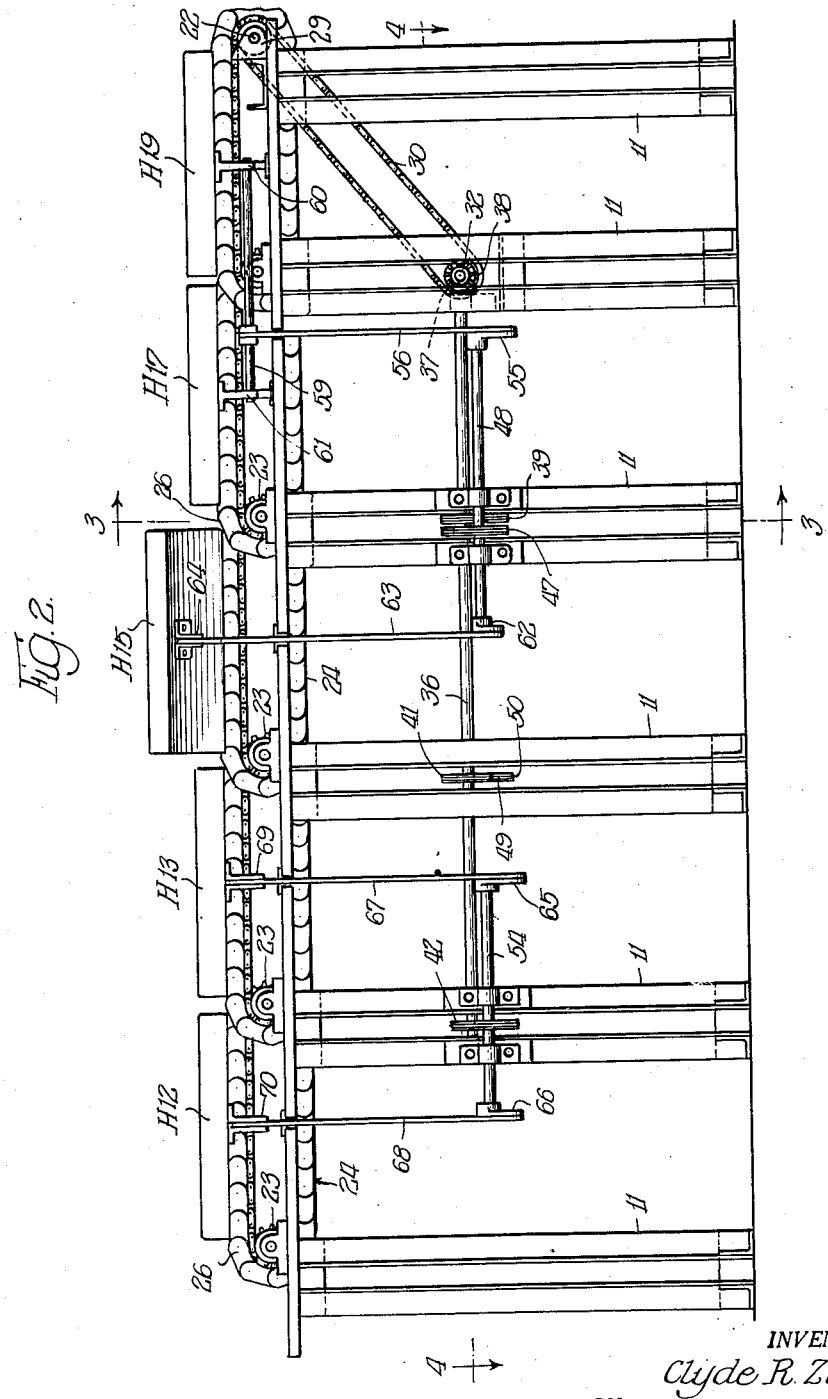

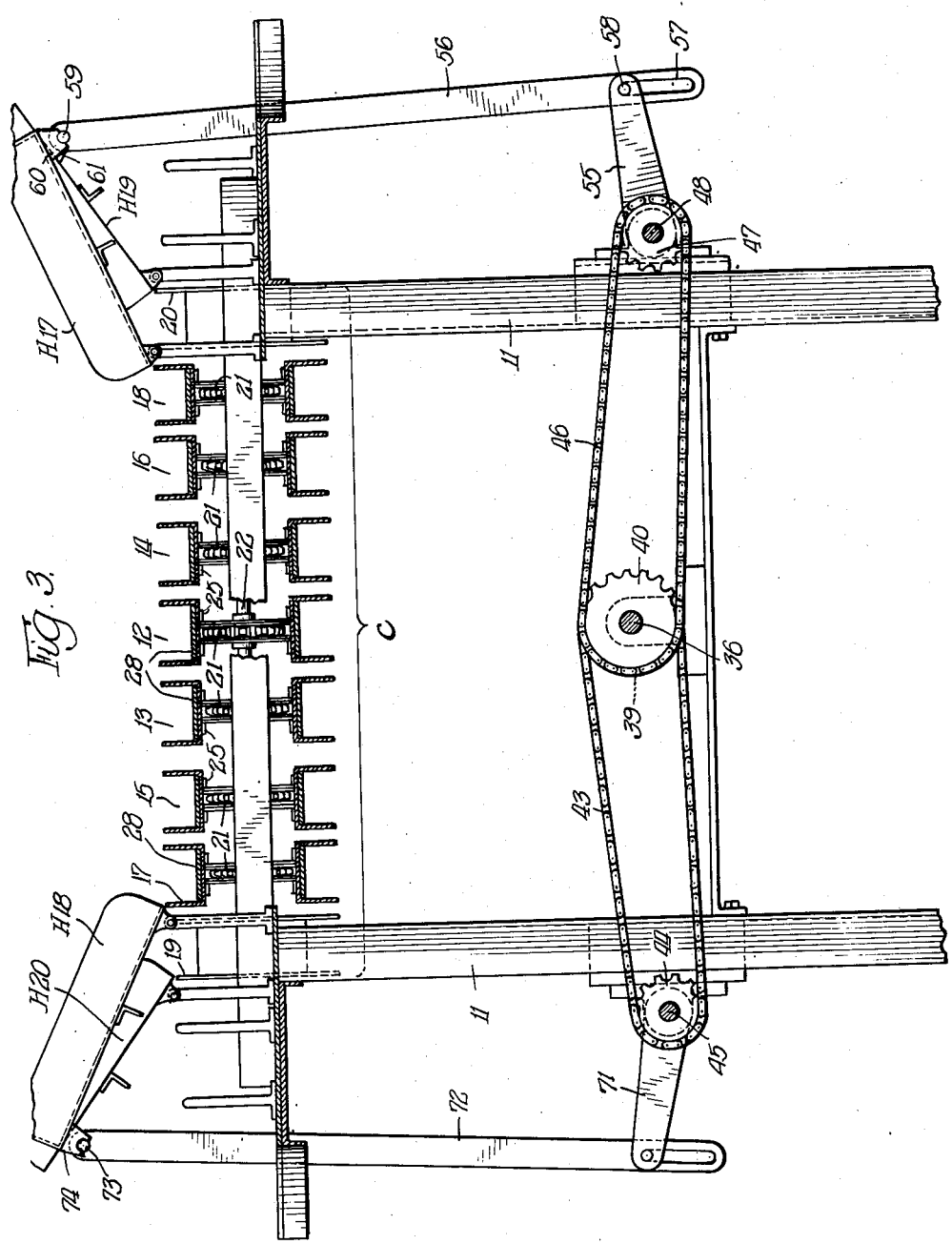

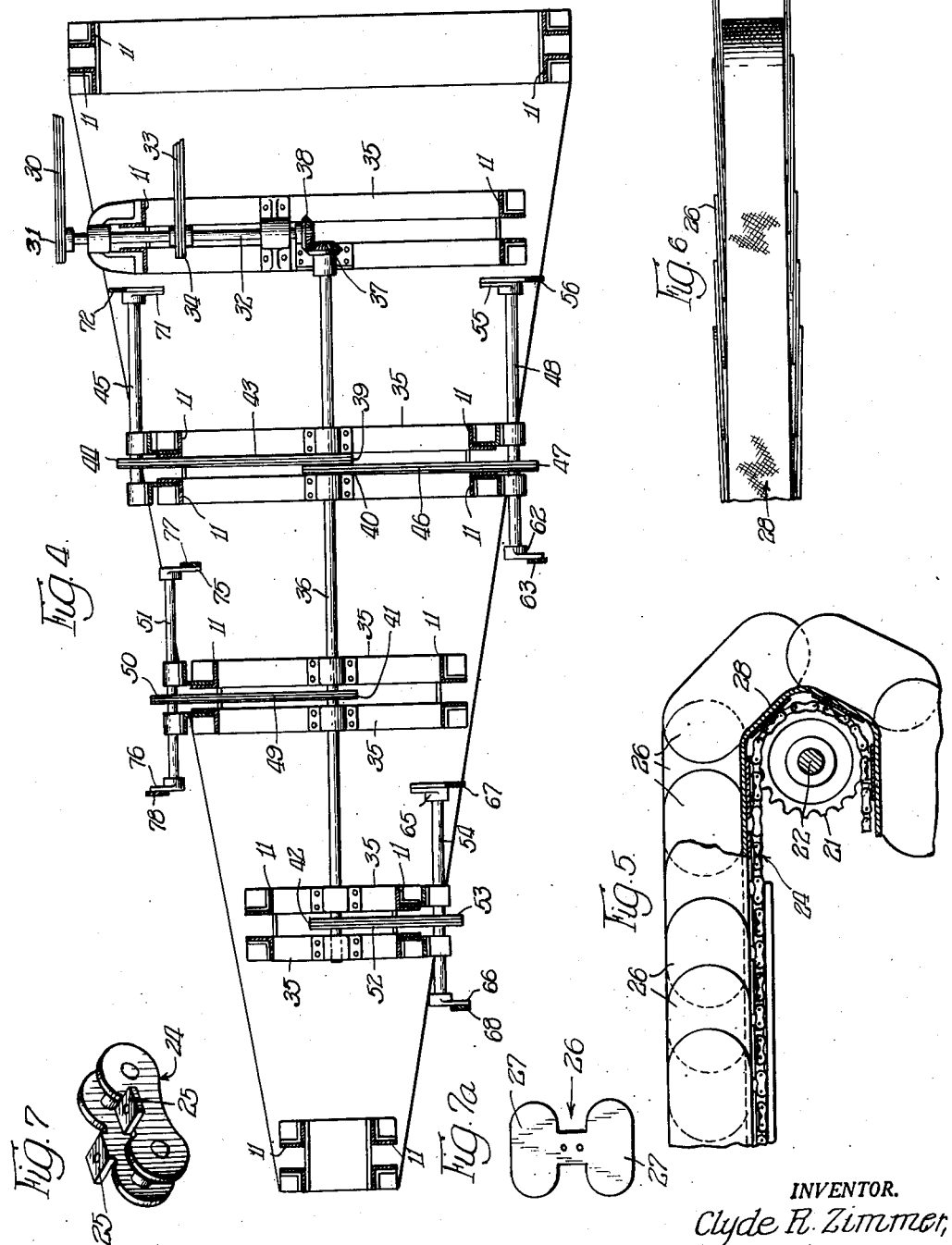

2,510,359

UNITED STATES PATENT OFFICE 2,510,359

ROW FEEDING APPARATUS

Clyde R. Zimmer, Chicago, Ill., assignor to E. J. Brach & Sons, Chicago, Ill., a corporation of Illinois Application April 12, 1945, Serial No. 587,969

8 Claims. (Cl. 198—30)

The present invention relates to the manufacture of candy. More particularly, it pertains to an apparatus, and method, for feeding candy pieces, or the like, from selected allotments into spaced apart parallel rows to facilitate subsequent operations, including coating and packing, in a manner such that each row will maintain similar pieces therein without becoming intermingled with adjacent rows having different pieces therein.

Heretofore, the most suitable apparatus available was a single belt conveyor placed at the end of a conventional enrobing conveyor. Over the belt conveyor was mounted an elongated frame having downwardly and inwardly inclined side walls and an inwardly inclined rear wall. These side walls at their front end adjacent the enrober conveyor were positioned more closely together than at their opposite rear ends. The front end of the frame had no end wall and remained open. The candy pieces to be coated and ultimately packed constitute a variety of different shapes and forms. These were dumped into the confining frame-like structure at random without any attempt at making a predetermined selection of various allotments. Consequently they were piled on top of each other and intermingled in such a manner that, as they were carried by the belt conveyor through the frame toward its opening, they were subjected to a crushing, piling and shearing action, especially as they approached the narrowed portion of the frame previous to being discharged onto the end portion of the enrober conveyor. The abuse to which the candy pieces, or centers, were subjected was obviously conducive to a great deal of waste and was considered uneconomical for other reasons. However, despite the problems which were thus created, the procedure was continued for a long time because there were certain advantages present and there had been no other solution to the problem in the meantime.

Different shapes and forms of candy pieces indicate different flavors. For example, squares represent caramel, half round pieces are chocolate, those shaped like a parallelogram or diamond are orange, circular pieces are maple, oval pieces are vanilla, rectangularly shaped pieces are nougat, cylindrical or partly cylindrical sticks, or pieces, are peanut butter, the heart shaped pieces are jelly, and the crescent type pieces are raspberry. Of course, the different configurations which indicate different flavors are changed when desirable.

Formerly, as the pieces were fed to the end of the enrober conveyor, it was necessary to have a number of skilled operators stationed on each side thereof who, recognizing the different flavors of the pieces by their shapes, would sort them and, in the best manner possible, arrange them in parallel rows with similar pieces in each row. Other than the skill and speed contributed by each operator there was nothing which gave any assurance of substantially complete uniformity in the selection and proper arrangement of the candy pieces. After passing through the enrober machine, which coats the candy pieces, for example, with chocolate, they are transferred to another conveyor to be cooled and packed. The assortment of candy pieces to be placed in the boxes by the packers also depended on this operator's skill and speed in making the proper selection. While this has been considered a satisfactory procedure in some instances, it has been attended by many difficulties and disadvantages. The advantages of a means, and a method, for automatically accomplishing the same results has long been desired, and this has now been accomplished by the present invention.

Generally, it is an object of this invention to overcome the foregoing difficulties as well as other disadvantages by the provision of an apparatus, and method, whereby selected allotments of candy pieces automatically can be arranged and conveyed in individual rows in such a manner that they can ultimately be handled and packed by inexperienced and fewer operators and packers.

More specifically, it is an object of the invention to provide an apparatus, and a method, whereby a plurality of adjacently disposed conveyor members are each adapted to receive an allotment of assorted and selected candy pieces and to simultaneously convey these allotments to the end of the apparatus and to discharge them therefrom in rows; and a plurality of hoppers, each one of which is mounted adjacent one of the conveyors and adapted to receive such allotments and continue to feed the pieces periodically into the proper conveyors in timed relation with the movement of the conveyors.

Yet more specifically, it is an object of the invention to provide such an apparatus, and a method, involving a plurality of hoppers mounted above the apparatus and adapted to receive allotments of selected candy pieces and to discharge the same at predetermined periods of time into a plurality of adjacently disposed conveyor members, each of which is located beneath one of the hoppers and which is adapted to receive a selected allotment of similar pieces and simultaneously to convey them to the end of the apparatus and discharge them therefrom in longitudinally disposed spaced apart rows onto a conventional enrober conveyor; and a shaker mechanism adapted to receive each row of candy pieces and to maintain them on the enrober conveyor and simultaneously therewith to vibrate the pieces into single file alignment as they are advanced along the enrober conveyor.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 1 is a plan view illustrating an automatic row feeding apparatus for candy pieces, or the like;

Fig. 2 is a side elevation of the apparatus depicted in Fig. 1;

Fig. 3 is a transverse sectional view taken along the lines 3—3 of Fig. 2 and looking in the direction of the arrows, that is, toward the discharge end of the apparatus;

Fig. 4 is a transverse sectional plan view taken along the lines 4—4 of Fig. 2, substantially midway between the top and bottom of the apparatus, and looking in the direction of the arrows;

Fig. 5 is a side elevational view, partly in section, of a fragmentary portion of a flexible trough conveyor;

Fig. 6 is a plan view of Fig. 5;

Fig. 7 is a detailed view, in perspective, of a link construction in a conveyor chain suitable for securing sections of the trough member of the conveyor;

Fig. 7a is a plan view of a cutout blank prior to shaping the same to provide one of the trough sections of the conveyor and before securing it to a link such as that shown in Fig. 7;

Fig. 8 is a side elevational view of a shaker mechanism disposed below the discharge end of a conveyor and above an enrober conveyor; and Fig. 9 is a plan view of the shaker mechanism depicted in Fig. 8.

*The row feeding apparatus*

Referring more particularly to Fig. 1 of the drawings, there is illustrated generally at 10 an automatic row feeder, for candies, or the like, which appears to be V-shaped in plan view. Primarily, this apparatus consists of a group of conveyor members indicated generally at C and a group of tiltable hoppers labeled H12, H13, H14, H15, H16, H17, H18, H19 and H20.

Preferably, the conveyor members are of different lengths and mounted between side frames 11. In its preferred form, the apparatus utilizes a plurality of conveyor members, one of them, 12, being a center conveyor disposed along the longitudinal axis of the apparatus. Adjacently disposed conveyors 13 to 20, which are all shorter than the center conveyor 12, terminate along a line substantially perpendicular to the longitudinal axis of the apparatus, together with conveyor 12, at the discharge end. It will be observed that pairs of the conveyors, for example 13 and 14, are of equal length, as are conveyors 15 and 16, 17 and 18, 19 and 20, but that they are of diminishing length in the order named. The conveyors at the discharge end of the apparatus are all mounted upon and rotated by individual gears 21 secured to a driven shaft 22. The other end of each individual conveyor is carried by a gear 23. From a more detailed inspection it will be seen that the conveyors are actuated around these gears by means of an endless chain 24, each conveyor being secured to links in the chain having outwardly extending lugs 25 (Figs. 3 and 7).

The conveyor comprises a series of upstanding tapered interlocking cups or plates 26 which provide a continuous trough. These plates are substantially H-shaped when in flattened position (Fig. 7a) and are secured to the lugs 25, for example, by means of rivets. When the legs, or wings, of the H-shaped plates are bent upwardly at right angles to the remainder of the cross piece forming the plate, they are tapered slightly so that they can be made to interfit with respect to each other (Figs. 5 and 6). Each chain 24 being endless, and secured to the sections of upwardly bent interfitting plates to provide upstanding side walls, there is provided a continuous trough conveyor. An endless canvas belt 28 is provided along the bottom of the trough to provide a suitable floor for the conveyor.

The shaft 22 is rotated by means of a sprocket 29 secured to one end thereof which drives a chain 30 (Figs. 4, 5 and 6). The chain 30 is looped around another sprocket 31 on a driven shaft 32. The shaft 32 is journaled in suitable bearings on one of the cross braces 35 of the framework. The driving mechanism for this arrangement may be any suitable source of power such as, for example, a motor (not shown) driving a chain 33 looped around a sprocket 34 on the driven shaft 32.

Disposed longitudinally of the machine, between the side frames 11, and suitably journaled in bearings on cross braces 35 is another driven shaft 36. This shaft has a bevel gear 37 meshed with a bevel gear 38 on the driven shaft 32 by which it is rotated. At spaced intervals on this shaft are located sprockets 39, 40, 41 and 42. Around the sprocket 39 is a chain 43 extending between the side frames 11 and this chain is looped around a sprocket 44 secured to a jack shaft 45. On the opposite side of the machine a chain 46, looped around the sprocket 40, extends between the side frames 11 and is looped around a sprocket 47 on a jack shaft 48. The chain 49 is looped around the sprocket 41, extends between the side frame 11, and is looped around a sprocket 50 secured to a jack shaft 51. A chain 52 is looped around the sprocket 42 and extends between the side frames 11 and is looped around another sprocket 53 on a jack shaft 54. All of the aforementioned jack shafts are suitably journaled in bearings on their respective side frames.

Referring now to Figs. 2, 3 and 4, and in particular to jack shaft 48, there is shown an extension arm 55 secured thereto. This extension arm is connected to a link 56, which is slotted at its bottom as at 57, by means of a fixed pin 58 on the arm 55 extending through the slot. The other end of the link 56 is connected to a horizontally disposed bar 59 (Fig. 2). This bar is connected at each end to lugs 60 and 61. Lug 60 is secured to the hopper H19 and lug 61 is secured to the hopper H17. It will be observed that the rotation of the shaft 36 causes the rotation of the jack shaft 46 by means of the chain 40 looped around the sprockets 40 and 47 and that the arm 55 is rotated to cause the lowering and raising of the link 56 in a manner such that both of these first named hoppers, H19 and H17, are raised and lowered substantially simultaneously, as will more fully appear hereinafter.

At the other end of the jack shaft 46 is another arm 62 similar to arm 55. This arm 62 actuates a slotted link 63 pivotally secured to a lug 64 on the next hopper H15 to raise and lower the same. It might be observed at this time that all of these links, and those hereinafter mentioned, are similarly slotted so that the various hoppers will be permitted to come to horizontal position and remain so for a period of time to permit filling the same with selected allotments of candy pieces.

The next jack shaft 54 to the left (Fig. 2) has secured at each end arms 65 and 66 similarly connected to slotted links 67 and 68 respectively. Slotted link 67 is pivotally secured to a lug 69 to raise and lower the hopper H13 and slotted link 68 is pivotally secured to a lug 70 to raise and lower the hopper H11.

On the other side of the apparatus the arrangement of hoppers is somewhat similar. On jack shaft 45 there is secured an arm 71 (Figs. 3 and 4) which actuates a link 72 in the same manner as does arm 55 when actuating link 56. This link is pivotally secured to a cross bar 73 which in turn is secured to lugs (only one of which is shown at 74, Fig. 3) on hoppers H20 and H18. These hoppers are similarly raised and lowered substantially simultaneously as are hoppers H17 and H19. At the other end of the jack shaft 45 there is no extension arm.

Referring again to Fig. 4 it will be seen that there is secured to jack shaft 51 arms 75 and 76 which are similar to arms 55, 62, 65, 66 and 71 and these are connected to slotted links 77 and 78 to operate in the same manner as the other slotted links. Slotted links 77 and 78 are also pivotally secured to lugs (not shown) on hoppers H16 and H14 to raise and lower these hoppers in a manner similar to which the other hoppers are raised and lowered but at different times.

It will be observed that each hopper is disposed in position with respect to its adjacent conveyor so that it can readily discharge its contents into the end of the conveyor during operation. The group of conveyors C are put in operation by the rotation of the driven shaft 32. This shaft, as heretofore explained, transmits its driving power to shaft 36 which actuates the various hoppers.

*Operation of the row feeding apparatus*

Assuming that all the hoppers have been filled, they will be actuated in the following order: Hopper H12 will be tilted so as to empty its allotment of selected candy pieces into the conveyor 12. About the time hopper H12 begins to be lowered, hoppers H13 and H14 begin to rise. When these hoppers reach their uppermost tilting positions the candies in conveyor 12 will have reached a point abreast thereof. At this point the contents of hoppers H13 and H14 will discharge into conveyors 13 and 14 respectively. By the time these last named conveyors have begun to be lowered the hoppers H15 and H16 begin to rise and as the candies in rows 12, 13 and 14 reach a point abreast of these two hoppers they will discharge their contents into conveyors 15 and 16. When the last named hoppers begin to be lowered, hoppers H17, H18, H19 and H20 begin to rise substantially simultaneously, hoppers H19 and H20 lagging slightly behind hoppers H17 and H18. About the time the candies in rows 12, 13, 14, 15 and 16 are abreast of hoppers H17 and H18 they begin to discharge their contents into conveyors 17 and 18. Shortly thereafter hoppers H19 and H20 do the same so that the conveyors carry, as disclosed in the present construction, nine charges of different selected candy pieces to the discharge end of the apparatus. It should be understood that the movement of the conveyors is very slow and that the movement of each hopper is equally slow but in timed relation with respect to the movement of the conveyors. This timed relation is such that there are no gaps between succeeding rows of candies. The hoppers function in such a manner that the rows of candy pieces are continuous rather than in spaced apart longitudinal position. The only spacing apart of the rows of candy is with respect to adjacent rows so that there is no intermingling of different candies and this is brought about because of the trough-like construction of the conveyors as illustrated in Figs. 3, 5 and 6.

Even though the speed of the machine is very slow it is necessary to stop the same from time to time during its operation because of the manner in which it so efficiently feeds the rows of selected candies. The starting and stopping of the machine thus far described preferably is controlled by an attendant by means of a foot treadle operated clutch (not shown) somewhere beneath the shaker mechanism about to be described at which point the attendant is stationed.

*The shaker mechanism*

Disposed beneath the discharge end of the automatic row feeder, and above the starting end of an enrober conveyor, is a shaker mechanism indicated generally at 80 (Figs. 8 and 9). This mechanism actually rests on the enrober conveyor at this point. In its preferred form it comprises a frame having end bars 81 and 82 disposed transversely of the conveyor. These frames are joined by side plates 83 and 84. These side plates are sufficiently high so as to prevent any of the candy pieces from falling off the conveyor. The end members 81 and 82 are joined by bars, or rods, 85. These bars, or rods, are spaced apart a distance approximately equal to the distance between the side walls forming the trough of the conveyors C. In the center of the bar member 82 there is secured a pivot lug 86 so as pivotally to mount the frame on an extension member 87 secured to a bridging piece, or yoke, 88 transverse of the conveyor and secured to the side frame of the enrober conveyor in any suitable manner. At the opposite end of the shaker mechanism the member 81 comes to rest on a slide bar 89 also disposed transverse of the apparatus and secured to the side frames of the row feeder apparatus 10. In the middle of the member 81 is a lug 90 to which is secured a rod 91 eccentrically mounted, for example, as illustrated generally at 92. The rod 91 may be driven by any suitable individual motor or it may secure its power from any suitable power transmission arrangement in conjunction with any of the driving mechanisms associated with the row feeder or enrober conveyor. The function of this eccentric movement is to oscillate, shake or vibrate the frame 80. To prevent candy pieces from being discharged from the conveyors and being thrown onto the floors, and at the same time readily to permit the vibrating or oscillating action, the side frames 83 and 84 of the shaker mechanism are each provided with an apron of canvas material as indicated at 93.

As heretofore described, the candy pieces which are conveyed to the enrober conveyor are a selected assortment of various shapes and forms whereby different flavors and types of candies readily can be identified. By way of illustration, such candy pieces have been shown after being discharged from the conveyor mechanism onto the enrober conveyor between the side frames 83 and 84 and the horizontally spaced apart bars, or rods, 85. For example, the candy pieces being discharged from the center conveyor 12 might be oval, representing vanilla; from the conveyor 13 rectangular, representing nougat; from the conveyor 14 round, representing maple; from conveyor 15 stick form, representing peanut butter; from conveyor 16 diamond or parallelogram shaped, representing orange; from conveyor 17 heart shaped, representing jelly; from conveyor 18 half circle, representing chocolate; from conveyor 19 crescent shaped, representing raspberry; and, from conveyor 20 square shaped, representing caramel. It will also be observed that as the candy pieces are first deposited from the discharge end of the conveyors C, onto the enrober conveyor between the rods 85 and the side frames 83 and 84 of the shaker mechanism, they are still somewhat bunched and in irregular distribution but nevertheless they have not been intermingled. The rapid vibrating or shaking of the frame, as the candies are being carried along by the enrober conveyor, tends definitely to arrange them into single file alignment. Thus, rather than an irregular and mixed pattern resulting where the success of the method depends on the skill of operators, the automatic combined functioning of the row feeder 10, in conjunction with the shaker mechanism 80, produces a definite and constantly regular pattern of candy pieces, properly arranged and distributed for the subsequent operations to be performed. In this manner the candy pieces enter the enrober where they are coated, then the cooling tunnel and thereafter they are advanced along the conveyors to packers, in the identical pattern in which they left the shaker mechanism.

It will thus be seen that the objects hereinbefore set forth can readily and efficiently be attained and since certain changes in carrying out the above method and in the constructions set forth, which embody the invention, may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In apparatus for feeding assorted allotments of different kinds of candy pieces, or the like, in spaced apart parallel rows, to facilitate subsequent operations such as coating and packing, in a manner such that each row will maintain similar pieces therein without becoming intermingled with adjacent rows having different pieces therein, a plurality of adjacently disposed uncommunicating trough conveyor members, each of which is adapted to receive an allotment of said pieces separated from each other and simultaneously to convey said allotments to the end of said apparatus and discharge the same therefrom in rows, and a plurality of hoppers, each one of which is mounted adjacent one of said conveyors and adapted to receive allotments of said pieces and to feed them onto said conveyors, one of said conveyors being a center conveyor disposed along the longitudinal axis substantially the entire length of said apparatus, and the remaining conveyors being adjacently disposed to said center conveyor and substantially shorter than said center conveyor and terminating along a line substantially perpendicular to said longitudinal axis at the discharge end of said apparatus, and each conveyor having its hopper disposed at the other end of each adjacent conveyor and tiltable in timed relation with respect to the operation of said conveyors, whereby all allotments of said candy pieces arrive at the discharge end of the conveyor simultaneously and are discharged therefrom in separated allotments.

2. In apparatus for feeding assorted allotments of different kinds of candy pieces, or the like, in spaced apart parallel rows, to facilitate subsequent operations such as coating and packing, in a manner such that each row will maintain similar pieces therein without becoming intermingled with adjacent rows having different pieces therein, a plurality of adjacently disposed endless uncommunicating trough conveyors, each of which is adapted to receive an allotment of said pieces separated from each other and simultaneously to convey said allotments to the end of said apparatus and discharge the same therefrom in rows, a plurality of hoppers, each one of which is pivotally mounted adjacent one of said conveyors and adapted to receive allotments of said pieces, and means to raise and lower each hopper successively about its pivot point to discharge said pieces onto said conveyors, one of said conveyors being a center conveyor disposed along the longitudinal axis substantially the entire length of said apparatus, and the remaining conveyors being adjacently disposed to said center conveyor and substantially shorter than said center conveyor and terminating along a line substantially perpendicular to said longitudinal axis at the discharge end of said apparatus, and each conveyor having its hopper disposed at the other end of each adjacent conveyor and tiltable in timed relation with respect to the operation of said conveyors, whereby all allotments of said candy pieces arrive at the discharge end of the conveyor simultaneously and are discharged therefrom in separated allotments.

3. In apparatus as defined in claim 2, and wherein said conveyors have upstanding side walls providing a continuous trough to hold said pieces on said conveyors.

4. In apparatus as defined in claim 2, and wherein said conveyors have sectional upstanding side walls provided by spaced apart overlapping plates movable with respect to each other to provide a continuous trough to hold said pieces on said conveyors.

5. In apparatus as defined in claim 2, and wherein said means includes a drive shaft and link members connected with said hoppers and actuated by said drive shaft, whereby to raise and lower each of said hoppers to discharge their contents onto their respective conveyors in a step-by-step manner.

6. In apparatus for feeding assorted allotments of different kinds of candy pieces, or the like, in spaced apart parallel rows, to facilitate subsequent operations such as coating and packing, in a manner such that each row will maintain similar pieces therein without becoming intermingled with adjacent rows having different pieces therein, a plurality of hoppers mounted above said apparatus and adapted to receive allotments of said pieces and to discharge the same at predetermined periods of time, a plurality of adjacently disposed uncommunicating trough conveyor members, each of which is located beneath one of said hoppers and adapted to receive an allotment of said pieces and simultaneously to convey said pieces to the end of said apparatus and discharge the same therefrom in rows onto a conventional conveyor, one of said conveyors being a center conveyor disposed along the longitudinal axis substantially the entire length of said apparatus, and the remaining conveyors being adjacently disposed to said center conveyor and substantially shorter than said center conveyor and terminating along a line substantially perpendicular to said longitudinal axis at the discharge end of said apparatus, and each conveyor having its hopper disposed at the other end of each adjacent conveyor and tiltable in timed relation with respect to the operation of said conveyors, whereby all allotments of said candy pieces arrive at the discharge end of the conveyor simultaneously and are discharged therefrom in separated allotments, and a shaker mechanism disposed beneath the discharge end of said apparatus and above said conventional conveyor, and adapted to receive each row of said pieces and to maintain them on said conveyor and simultaneously therewith tend to arrange said pieces into single file alignment as they are advanced along said conveyor.

7. In apparatus as defined in claim 6, and wherein said shaker mechanism is provided with a plurality of guideway members longitudinally disposed with respect to said conveyors and adapted to maintain said different allotments of pieces in row alignment and to prevent them from intermingling with each other.

8. In apparatus as defined in claim 6, and wherein said shaker mechanism is provided with a plurality of guideway members longitudinally disposed with respect to said conveyors and adapted to maintain said different allotments of pieces in row alignment and to prevent them from intermingling with each other, said guideway members being secured together at their ends in spaced apart relationship within a frame adapted to be vibrated.

CLYDE R. ZIMMER.

REFERENCES CITED

The following references are of record in the file of this patent:

UNITED STATES PATENTS

| Number | Name | Date |
| --- | --- | --- |
| 508,092 | Danehy | Nov. 7, 1893 |
| 571,663 | Hartman et al. | Nov. 17, 1896 |
| 708,255 | Prouty | Sept. 2, 1902 |
| 747,285 | White | Dec. 15, 1903 |
| 760,417 | Budd | May 24, 1904 |
| 832,207 | Pierce | Oct. 2, 1906 |
| 1,112,948 | Turnbull | Oct. 6, 1914 |
| 1,279,562 | Lowell | Sept. 24, 1918 |
| 1,459,367 | Hawes | June 19, 1923 |
| 1,685,335 | Paterson et al. | Sept. 25, 1928 |
| 1,702,901 | Hungerford | Feb. 19, 1929 |
| 1,755,720 | Winkler et al. | Apr. 22, 1930 |
| 1,925,990 | Pampel | Sept. 5, 1933 |
| 2,036,421 | Luckie | Apr. 7, 1936 |
| 2,065,205 | Appleyard | Dec. 22, 1936 |
| 2,075,012 | Baker | Mar. 30, 1937 |
| 2,088,247 | Paton | July 27, 1937 |
| 2,320,985 | Overland | June 1, 1943 |

FOREIGN PATENTS

| Number | Country | Date |
| --- | --- | --- |
| 20,418 | Great Britain | Sept. 18, 1902 |
| 472,516 | Germany | Mar. 1, 1929 |
| 489,032 | France | Oct. 17, 1918 |